United States Patent Office 2,991,348
Patented July 4, 1961

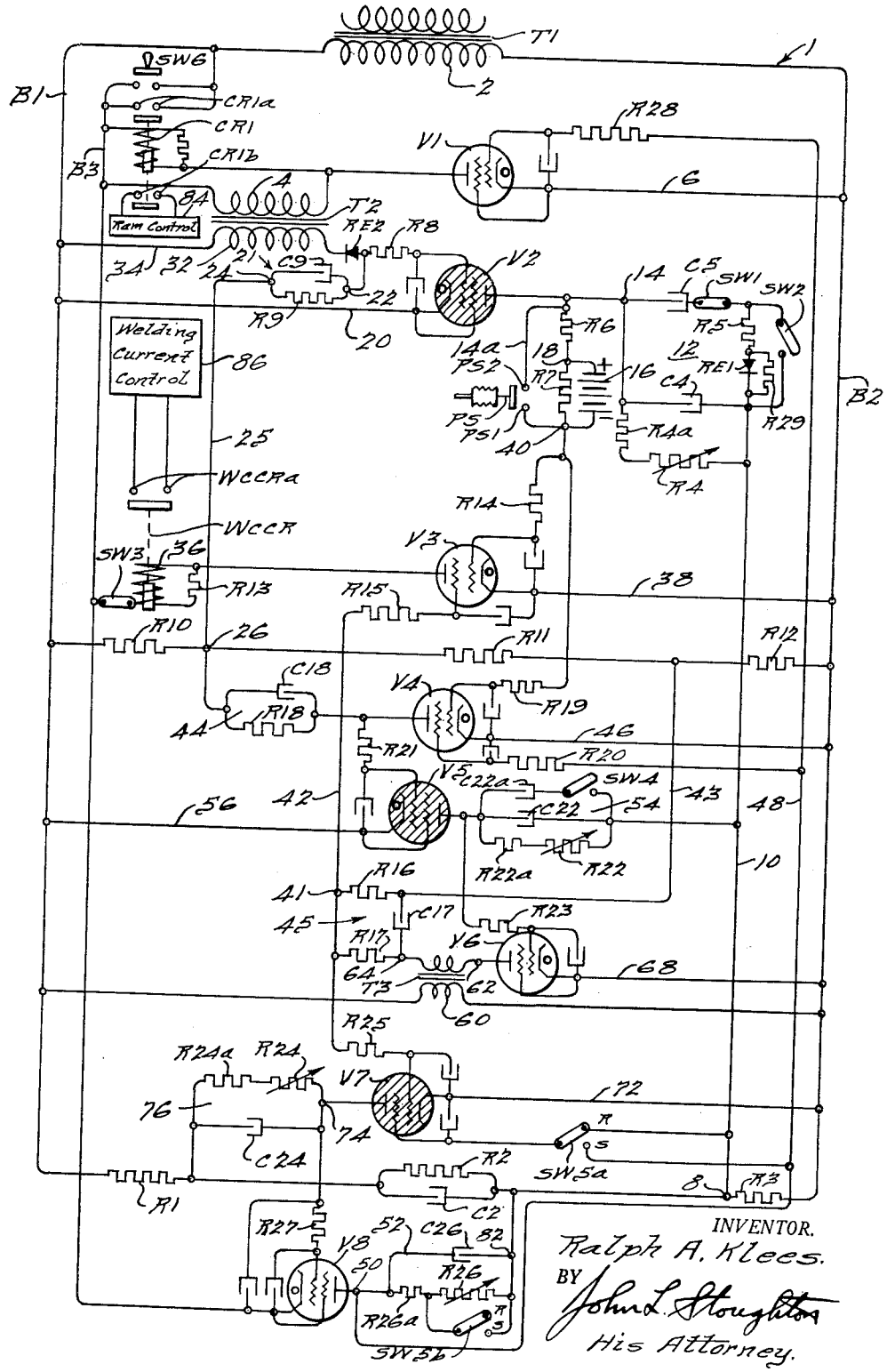

2,991,348
TIMING CIRCUIT
Ralph A. Klees, Inglewood, Calif., assignor to Weltronic Company, a corporation of Michigan
Filed Aug. 10, 1956, Ser. No. 603,250
20 Claims. (Cl. 219—114)

This invention relates generally to an electronic timing device and more particularly, to a device which is useful for controlling the various sequential operations of a resistance welding machine. A usual welding machine timer, the various sequential steps designated in the art as "squeeze time," "weld time," "hold time," and "off-time." "Squeeze time" is the time interval between the time that the ram mechanism is actuated to move the welding electrodes against the work to be welded and the time that the electrodes are energized for welding current flow. "Weld time" is, of course, the time interval during which the electrodes are energized and welding current flows therebetween and through the work. "Hold time" is the time interval between the time that the weld current flow is terminated and the time that the ram mechanism is actuated to move the electrodes from the work. "Off time" is the time interval, in repeat operation, between the time that the ram mechanism is actuated to move the welding electrodes away from the work and the time that the electrode control mechanism is actuated to once again move the electrodes into contact with the work for a subsequent welding operation. The "off time" provides an interval during which the operator may move the work from one position to another when a series of weld spots are to be made on a workpiece.

In high speed production it is desirable that the welding cycle be as short as possible in order that the machine may be made to provide its maximum output. It is the purpose of this invention to control the "squeeze time" interval so that it is made as short as possible but yet is kept long enough for the electrodes to properly seat against the work and, in some instances, to slightly deform the work, before the welding current is caused to flow.

In usual welding practice, the electrodes and their actuating mechanism are relatively massive and as such have considerable inertia to movement. Also, many are actuated by a fluid system. All require a finite time for movement. Thus, if the actuating mechanism is operated for only, say, five cycles (measured on a 60 cycle per second base) to open or close the electrodes, the electrodes would move a certain distance while if the fluid mechanism is operated for a longer interval, say, sixty cycles, the electrodes would move a greater distance.

In order that work may be introduced between the electrodes, they must initially be spaced apart a relatively great distance. When, however, the work is being moved from one weld position to another, a lesser opening between the electrodes is many times satisfactory. It will be appreciated that a "squeeze time" interval of sufficient duration to allow the electrodes to move this greater initial distance must be provided for the initial sequence in order to provide a sufficient time for the electrodes to be properly seated against the work. If this same "squeeze time" is maintained then the subsequent "squeeze time" intervals are greater than necessary to have the electrodes properly seat against the work since, in repeat operation, the electrodes are moved apart a lesser distance before they are again actuated to reclamp the work. The use of the variable opening of the electrodes is not new and such variation may be built into the welding machine itself in the form of stops or, as is more usual, is controlled by changing the "off time" interval. When the "off time" interval is shortened, the electrode mechanism is given less time in which to open the electrodes and consequently they will not open so far apart.

It has become common practice to reduce the "off time" interval so that it is only long enough for the operator to move to the next weld spot, after which the electrode actuating mechanism is reactuated to clamp the electrodes against the work for the next weld. When this is done, the lesser opening of the electrodes between successive welds does not require such a long "squeeze" interval as was required for the initial squeeze interval. It is, therefore, desirable to provide a timer in which the "squeeze time" is automatically variable depending upon the distance that the electrodes are moved apart between successive welds of a series of welds.

I am aware that I am not the first to provide for a longer initial squeeze time. However, in all of the structures with which I am familiar, this longer initial "squeeze time" is obtained by the use of a separate timing device which is made to time out during the first operation of a series of welding operations, and which added timing device is then ineffective during the balance of the repeating welding operations. This type of initial "squeeze time" has worked out fairly satisfactorily but it is expensive since it embodies an additional timing device which usually includes an extra electric valve, an RC timing network, and an added relay device.

It is a prime object of my invention to provide a new and improved timing device of the character described which is economical to manufacture and trouble free in operation.

Another object is to provide such a timing device in which the "squeeze time" is automatically variable.

Another object of this invention is to provide a timing device in which the "squeeze time" interval is automatically regulated as a function of the distance which the electrodes are required to travel to engage the work.

A further object of this invention is to provide a timing device in which the "squeeze time" is variable controlled as a function of the "off time."

A still further object is to provide such a timing device in which the added "squeeze timing" function is inexpensively incorporated.

Other objects will be apparent from the description, the appended claims and the drawings; in which the sole figure shows a schematic representation of a sequence timer for a resistance welding apparatus embodying the invention.

Referring to the drawings by character of reference, the timer 1 comprises a plurality of valves V1–V8 inclusive, which have their conducting condition changed to actuate a resistance welder, not shown. The valves V1–V8 preferably are of the thyratronic type, although in a generic sense other types such as high vacuum types may be used. The timer 1 is energized through a transformer T1 from a suitable source of alternating potential. The secondary 2 of the transformer T1 is connected to energize a pair of busses B1 and B2 and to selectively energize a third bus B3 with the same potential as the bus B1. The valves V1–V5, V7, and V8 have their anode circuits energized directly from the busses B1 or B3 and B2 while the valve V6 is energized from the busses B1 and B2 through a transformer T3.

The anode of valve V1 is connected through the energizing winding of a control relay CR1 connected in parallel with the primary winding 4 of a control transformer T2 to the bus B3. The cathode of valve V1 is connected by a conductor 6 to the bus B2. The busses B1 and B2 are interconnected by means of a plurality of series-connected resistors R1, R2, and R3. The magnitude of the resistance of resistors R1 and R3 may be equal and considerably less than that of the resistor R2. The potential appearing across the resistors R1 and R3 is utilized to impress a low magnitude A.-C. bias on the control circuits of the valves V1, V3, V4, and V6–V8 which rides on the normal direct potential biases applied to these valves, as will be described below. A capacitor C2 connected in parallel with the resistor R2 causes the A.-C. bias or ripple developed by the resistors R1 and R3 to lead the phase of the potential between the busses B1 and B2 whereby the valves are caused to fire early in the voltage wave applied between their main electrodes.

The cathode of the valve V2 is connected by means of conductor 20 to the bus B1. The anode of the valve V2 is connected to the bus B2 through a conductor 10 (which is connected to bus B2 through resistor R3) and a resistor-capacitor network 12. The impedance across the resistor R3 is small compared to that of the network 12 or to that of the resistor R2 and the potential drop across the resistor R3 is relatively unaffected by the conducting condition of valve V2. The timing network 12 is used to measure "squeeze time" and comprises a first capacitor C4 having in shunt therewith series-connected variable resistor R4 and fixed resistor R4a. Connected in shunt with the capacitor C4 are series-connected capacitor C5, switch SW1, resistor R5, and rectifier RE1. Connected in shunt with the resistor R5 and rectifier RE1 is a second switch SW2. When switch SW1 is closed and switch SW2 is open, the network 12 acts to vary its timing interval as a function of the length of time that valve V2 conducts. When both the switches SW1 and SW2 are closed, the timing interval measured by network 12 is constant but is of a greater length than when both switches SW1 and SW2 are open.

A pressure switch PS is located in a conductor 14a which is connected across the free end terminals of a pair of series-connected resistors R6 and R7. A suitable source of direct current potential, diagrammatically shown as battery 16, is connected across the resistor R7. The positive terminal is connected to the common point 18 between the resistors R6 and R7. The switch PS is a pressure switch which is actuated by the fluid pressure applied to the ram which moves the electrodes and is used merely to insure that a conducting bias cannot be applied to valves V3 and V4 until the ram is holding the electrodes against the work with sufficient force. In normal operation, closure of the switch PS does not result in conduction of the valves V3 and V4 since it is expected the network 12 will not have timed out until a time subsequent to closure of the switch PS. In many applications, the pressure switch PS is not used and in such event the terminals PS1 and PS2 are connected together by a shunt.

The control grid of the valve V2 is connected through the usual current limiting resistor R8, a resistor-capacitor network 21, resistor R10, bus B1, and conductor 20 to its cathode. The network 21 comprises parallelly connected resistor R9 and capacitor C9 and has one terminal 22 connected to the resistor R8 and the other terminal 24 connected by conductor 25 to a common terminal 26 between a pair of series-connected resistors R10 and R11 connected in series with a resistor R12 betwen the busses B1 and B2. The magnitude of the resistance of resistors R10, R11, and R12 is of the same general proportion as that of resistors R1, R2 and R3, discussed above. The network 21 is charged from the transformer T2. Its terminal 22 is connected through a rectifier RE2 to one terminal of the secondary winding 32 of the transformer T2 and its other terminal 24 is connected through conductor 25, resistor R10, bus B1 and conductor 34 to the other terminal of the secondary winding 32.

The weld current relay controlling valve V3 has its anode connected through the energizing winding 36 of the weld current control relay WCCR and through a control switch SW3 to the bus B3. A resistor R13 is connected in shunt with the winding 36 in accordance with customary practice when current is supplied to the relay WCCR in half cycle increments. The cathode of the valve V3 is connected by means of conductor 38 to the bus B2 thereby completing the circuit. The control grid of the valve V3 is connected through the usual current limiting resistor R14 to the terminal 40 of the resistor R7, through the resistors R7 and R6, network 12, conductor 10, resistor R3, bus B2, and conductor 38 to the cathode valve V3. The shield grid of the valve V3 is connected through the usual current limiting resistor R15, a conductor 42, common terminal 41 of a pair of series-connected resistors R16 and R17, the resistor R16, conductor 43, resistor R12, bus B2, and conductor 38 to the cathode of valve V3. A capacitor C17 is connected in shunt about the resistors R16 and R17 and this network 45 is selectively energized and deenergized by the valve V6.

Valve V4 has its anode connected to bus B1 through a resistor-capacitor network 44 and the resistor R10. The network 44 comprises a resistor R18 in shunt with a capacitor C18. As stated above in connection with the resistor R12 and the anode circuit of valve V2, conduction of valve V4 has no substantial effect on the drop across resistor R10, which is used to superimpose a small A.-C. voltage ripple in the bias circuits for valves V2 and V5. The anode circuit of valve V4 is completed by connecting its cathode through a conductor 46 to the bus B2. The control grid of this valve is connected through the usual current limiting resistor R19 to the terminal 40 and through resistors R7 and R6, network 12, conductor 10, resistor R3, bus B2 and conductor 46 to the cathode of valve V4. The shield grid of this valve is connected through a current limiting resistor R20, conductor 48 which is connected to terminal 50 of a resistor-capacitor network 52, through network 52, resistor R3, bus B2, and conductor 46 to the cathode of valve V4.

The anode of the valve V5 is connected to bus B2 through a resistor-capacitor network 54, conductor 10 and resistor R3 while the cathode thereof is connected to the bus B1 by conductor 56. The resistor-capacitor network 54 comprises a series-connected variable resistor R22 and fixed resistor R22a connected in shunt with capacitor C22. A second capacitor C22a is selectively connected in shunt with the capacitor C22 upon closure of the switch SW4. The control grid of valve V5 is connected through a current limiting resistor R21, the network 44, resistor R10, bus B1 and conductor 56 to the cathode of the valve V5.

Anode potential for valve V6 is supplied from a transformer T3 having its primary winding 60 connected between the busses B1 and B2. One terminal 62 of the secondary winding of the transformer T3 is directly connected to the anode of the valve V6 and the other terminal of this secondary winding is connected to the common terminal 64 of the resistor R17 and capacitor C17. The anode circuit for valve V6 continues through network 45, conductor 43, resistor R12, bus B2, and conductor 68 to the cathode of valve V6. The control grid of the valve V6 is connected through a current limiting resistor R23, network 54, conductor 10, resistor R3, bus B2 and conductor 68 to the cathode of valve V6.

The cathode of the valve V7 is connected by means of conductor 72 to the bus B2 and the anode thereof is connected to the bus B1 through a resistor-capacitor network 76 and resistor R1. The network 76 comprises series-connected variable resistor R24 and fixed resistor R24a connected in shunt with capacitor C24 and has a terminal 74 connected to the anode of valve V7. The control grid of valve V7 is connected through the usual current limiting resistor R25, resistor R16, conductor 43, resistor R12, bus B2 and conductor 72 to the cathode of valve V7. The shield grid is connected through a switch SW5a to the cathode either through the resistor R3 for repeat operation or through network 52 and resistor R3 for single weld operation.

The cathode of the valve V8 is connected directly to the bus B3 while the anode thereof is connected to the bus B2 through the resistor-capacitor network 52 and the resistor R3. The network 52 comprises series-connected variable resistor R26 and fixed resistor R26a connected in shunt with capacitor C26. One terminal 50 is connected to the anode of valve V8 and the other terminal 82 is connected to the common connection 8 between the resistors R2 and R3. A shunting switch SW5b is connected to selectively shunt out the resistor R26. The control grid of the valve V8 is connected through the usual current limiting resistor R27, network 76, resistor R1, busses B1 and B3 to the cathode of valve V8. The grid bias circuit of the valve V1 extends from its grid through the usual current limiting resistor R28, conductor 48, network 52, resistor R3, bus B2 and conductor 6 to the cathode of valve V1.

It is believed that the remainder of the details of construction can best be understood by description of the operation of the apparatus which is as follows:

With the primary winding of the transformer T1 energized from a suitable source of alternating potential, the secondary winding 2 thereof energizes the busses B1 and B2 with an alternating potential. Suitable circuitry, not shown, is provided for energizing the thermionic heaters, not shown, of the valves V1 through V8 in the usual manner, and which has been omitted from this schematic diagram for purposes of simplifying the circuit. If desired, in accordance with usual practice, a time delay mechanism may be employed to prevent anode potential from being supplied to the valves V1 through V8 until these valves have been heated to proper operating temperature.

Assuming that the transformer T1 has been energized, that valves V1 through V8 have been heated to operating potential, and that the delay mechanism, if any, has timed out, valves V2, V5, and V7 will conduct, and valves V1, V3, V4, V6, and V8 will remain nonconducting. Valve V1 will be prevented from conducting due to the open condition of the starting switch SW6 and the contacts CR1a of the relay CR1, whereby the bus B3 remains disconnected from the bus B1.

Since valve V1 is not conducting, the transformer T2 is not energized and the network 21 will not be energized. Valve V2, therefore, will conduct, anode to cathode, through network 12 causing the capacitor C4 to be immediately charged and, if the switch SW1 is closed and switch SW2 is open, causing the capacitor C5 to be charged at a reduced rate which is determined by the inverse current flow through the rectifier RE1 and resistor R5. (As will be explained, R29 represents diagrammatically this high impedance back or inverse current flow path.) The magnitude to which the capacitor C5 is charged depends, of course, upon the charging time, but under usual conditions will always become fully charged unless the timer 1 is operating to perform a series of repetitive welds. In this regard it should be noted that the parameters of the charging circuit of the capacitor C4 are such that if the valve V2 conducts during any half cycle the capacitor C4 will be fully charged; but the parameter of the charging circuit for the capacitor C5 is such that the valve V2 must conduct for a plural number of half cycles for capacitor C5 to be fully charged.

With valve V2 conducting, the network 12 will maintain the control grid of the valve V3 negative with respect to the cathode and the valve V3 will be biased into a nonconducting condition. When the pressure switch PS is used, the bias potential existing across the resistor R7 is sufficient to bias the valve V3 to nonconductivity irrespective of the network 12. When the switch PS closes, terminal 40 is directly connected to terminal 14 whereby conduction through valve V3 is controlled solely by the network 12. When switch PS is closed, a potential is established across resistor R6 which prevents short circuiting of the supply 16. The valve V4 is biased by the resistor R7 and network 12 in the same manner as is valve V3. Valve V4 will also be maintained blocked when the potential across the network 12 is above a minimum critical value or if the pressure switch PS is open irrespective of the network 12.

While valve V3 is nonconducting, the relay WCCR remains deenergized and the welding current control remains in a condition to hold the electrodes deenergized. Since the valve V4 is not conducting, the network 44 will be ineffective to bias the valve V5 into nonconductivity and valve V5 will conduct to charge the capacitor C22 and also capacitor C22a provided the switch SW4 is closed. The charge across the network 54 is applied between the grid and cathode of the valve V6 and maintains this valve nonconducting. With the valve V6 blocked, the network 45 will be ineffective to block the valves V3 and V7. Since valve V3 is being held blocked by the bias established across network 12 and/or resistor R7, it will not conduct but the valve V7 will conduct. When valve V7 conducts, current flows through the biasing network 76 charging the same, whereby it applies a blocking potential between the grid and cathode of the valve V8 keeping this valve from conducting. With valve V8 blocked, the off time network 52 in its anode circuit will remain deenergized and no blocking bias potential will be applied between the grid and cathode of the valve V1. Valve V1, therefore, remains in a condition to conduct upon energization of the bus B3.

In standby operation of the timer 1, valves V1 and V3 do not conduct and consequently the relays CR1 and WCCR remain deenergized. With relay CR1 deenergized, its contacts CR1b are open and the ram control 84 is ineffective to move the electrodes (not shown) into engagement with the work (not shown). With the welding current control relay WCCR deenergized, its contacts WCCRa are open and the welding current control 86 is ineffective to energize the electrodes.

To ready the timer 1 to make a number of welds upon a single workpiece, the switches SW5a and SW5b (which may be mechanically interconnected, if desired) are placed in their repeat positions; the switch SW1 is closed; the switch SW2 is opened; and weld-no weld switch SW3 is closed. The actual operation is initiated by closing the starting switch SW6 to connect the bus B3 to the bus B1. This completes the anode-cathode circuit of the valve V1, and as soon as the bus B3 becomes positive with respect to the bus B1, valve V1 conducts to energize the relay CR1 and the transformer T2. Energization of the relay CR1 causes its contacts CR1a to close to complete a holding circuit around the switch SW6 so that operation of the apparatus will not be interrupted during any welding sequence. In repeat operation of the control, the switch SW6 will normally be held closed until the last weld spot is initiated and the contacts CR1a are without effect until that time.

Closure of the contacts CR1b energizes the ram control 84 whereby the electrodes (not shown) are caused to move against the work (not shown) in the usual manner. Energization of the transformer T2 causes the capacitor C9 of the biasing network 21 to become charged by current flow from the secondary winding 32 through the rectifier RE2 and the charge will be in such polarity that the terminal 22 becomes negative with respect to the terminal 24. The network 21 being in the control grid circuit of the valve V2 and polarized in the foregoing described manner, places a blocking bias on the valve V2 terminating its further conduction to initiate squeeze time.

At the end of squeeze time, capacitor C4 or C4 and C5 will have discharged sufficiently through the resistors R4 and R4a so that the potential across the timing network 12 will have reached a minimum critical value. When this occurs, the valves V3 and V4 will conduct, to initiate a weld time period.

It has been assumed in the foregoing that the pressure switch PS closes prior to the time that the potential across the network 12 reduces to the minimum predetermined critical value so that conduction of the valves V3 and V4 is determined by the timing network 12. If, however, the pressure switch does not close during this time, the reaching of the minimum predetermined critical value by the network 12 will not result in conduction of the valves V3 and V4. In such an event the bias potential developed across the resistor R7 by the battery 16 will be sufficient to hold these valves blocked and unless the switch PS closes, the timer 1 "hangs up" at this point. The use of the pressure switch is primarily a safety precaution since the switch PS will normally close prior to the timing out of the squeeze time network 12. It will be assumed in the remainder of this description of operation that the pressure switch, if used, so closes. Many times a pressure switch is not used and in such event the terminals PS1 and PS2 to which the switch contacts are connected will be permanently shorted by a shunt.

When the valve V3 conducts, it energizes the welding current control relay WCCR causing it to close its contacts WCCRa. Closure of contacts WCCRa energizes the welding current control 86 whereby the welding electrodes (not shown) are energized through a suitable contactor (not shown) to cause welding current to flow through the work clamped between the welding electrodes. Conduction of the valve V4 energizes its anode network 44 whereby a blocking bias potential is placed between the control grid and cathode of the valve V5. When the valve V5 ceases conducting, the weld timing network 54 starts to time out to measure the weld time interval. After a predetermined interval, the potential across the network 54 reaches a predetermined minimum critical value and the valve V6 will commence to conduct. Conduction of valve V6 charges the network 45 to end the flow of welding current and to initiate the next sequence step of hold time.

Provision is made by means of switch SW4 to place the capacitor C22a into and out of parallel with circuit arrangement with the capacitor C22 whereby longer and shorter weld time intervals may be secured due to the greater and lesser energy to be dissipated.

When the valve V6 conducts, it energizes its anode network 45 which thereupon applies a blocking bias potential between the shield grid and cathode of the valve V3 to terminate further conduction of this valve causing relay WCCR to become deenergized and its contacts WCCRa to terminate further flow of welding current between the electrodes. The charged network 45 also places a blocking bias potential between the control grid and cathode of the valve V7 to terminate conduction of this valve.

Blocking of the valve V7 terminated further charging of the capacitor C24 of the hold time network 76 which thereupon commences to discharge at a controlled rate through the resistors R24 and R24a. At the end of a predetermined hold time interval, the charge across the network 76 will have reduced to a minimum critical value at which it is ineffective to maintain the valve V8 blocked and the valve V8 thereupon commences to conduct and charge the off time timing network 52. When charged, network 52 places a blocking bias potential between the control grid and cathode of the valve V1 and between the shield grid and cathode of valve V4. This causes valve V1 to terminate its conduction and cause the relay CR1 to become deenergized. When relay CR1 deenergizes, its contacts CR1b open to actuate the ram control 84 to cause the electrodes to move away from the work whereby the work may be moved to the next weld spot. Blocking of the valve V1 also deenergizes the transformer T2 to terminate further charging of the capacitor C9. When this occurs the capacitor C9 quickly discharges through the resistor R9 to a minimum critical potential thereby removing the blocking bias potential which it had previously maintained on the valve V2. Valve V2 thereupon reconducts to recharge the capacitor C4 of the network 12. With the network 12 recharged, the blocking bias potential is re-established between the control grids and cathodes of the valves V3 and V4. Since valve V3 was already held blocked by the bias potential existing between its shield grid and cathode due to the charged condition of network 45, this added bias is without immediate effect. It will, however, continue to keep valve V3 blocked when the network 45 subseqeuntly becomes deenergized. Likewise, valve V4 was already blocked by the bias potential between its shield grid and cathode established by the network 52 so that the added bias applied from the network 12 is merely for the purpose of holding this valve blocked when during the subsequent operational steps the network 52 times out.

When valve V4 became nonconductive due to the charged condition of network 52, the capacitor C18 of the network 44 quickly discharged through the resistor R18 removing the blocking bias on the valve V5 and permitting it to reconduct and recharge the weld time network 54. When the weld time network 54 recharges it re-establishes a blocking bias on the valve V6 which terminates its conduction, permitting the capacitor C17 of the bias circuit 45 to quickly discharge through the series-connected resistors R16 and R17. Discharge of the network 45 causes valve V7 to reconduct and re-energize the hold time network 76. With the hold time network 76 recharged, a blocking bias is re-established on the valve V8 permitting the capacitor C26 of the off time timing network 52 to discharge through the resistors R26 and R26a. When the network 45 discharged it also removed the blocking bias potential between the shield grid and cathode of the valve V3, but since the valve V3 is held blocked by the network 12 such removal is without effect.

At the end of a predetermined off time interval necessary for the charge across the network 52 to reduce to a predetermined minimum critical value, the blocking bias formerly established thereby will be removed from the valve V1 and from the shield grid of the valve V4 and the timer 1 is in condition to time a subsequent welding operation. If, as has been assumed, the switch SW6 is still closed, a subsequent operation of the timer will occur.

The switches SW5a and SW5b are provided so that, if desired, they may be moved from their shown position into their other position, in which case the timer will be in "single cycle operation" and will perform a single welding timing cycle each time the switch SW6 is opened and closed irrespective of the length of time that the switch SW6 may be held closed. This is true since the switch SW5a connects the shield grid to the network 52. With this arrangement, the valve V7 is maintained blocked as long as the network 52 is charged and since it is necessary to re-establish conduction in the valve V7 to discharge the network 52, the timer 1 will "hang up" after it has timed a single welding cycle. The timer 1 is reset by opening the switch SW6 to open the anode circuit of the valve V8 so that the network 52 can discharge independently of the valve V7. The switch SW5b is provided so that in "single cycle operation" the off time network 52 will discharge at a very rapid rate upon opening of the switch SW6 so that it need only remain open a very short interval of time before a reclosure thereof is effective to initiate a subsequent timing cycle of the timer 1.

In repeat operation, the time period of conduction of the valve V2 is directly related to the interval that the off timing network 52 maintains the valve V1 blocked. In other words, the length of time that charging current is being supplied to the network 12 is a variable depending upon the length of the off time interval. Capacitor C4 of the network 12, as has been discussed above, will charge very rapidly and will completely charge during any single half cycle that the valve V2 conducts. The charge obtained by the capacitor C4 is therefore substantially independent of the timing period of the off timing network 52 and therefore the minimum squeeze time is the time of discharge of the capacitor C4 through the resistors R4 and R4a. As was also discussed above, the capacitor C5 required a number of cycles for it to become fully charged. Therefore for any length of off time up to a time interval in which the capacitor C5 is fully charged, the length of time (squeeze time) required for the network to discharge to the critical minimum potential is a function of the length of off time.

A preferred form of rectifier is one of the dry disc type in which there is a relatively low impedance to current flow in the forward direction and a relatively high impedance to current flow in the reverse direction. As such the rectifier RE1 may be any of the copper oxide, selenium, silicon, and germanium types. The high resistance back current path is diagrammatically shown as a resistor R29. When a rectifier RE1 of a type having substantially no back current flow, such as a tube type rectifier, is used it may be shunted by a separate high resistance shunt R29 whereby the conduction of the valve V2 causes the capacitor C5 to charge at a reduced rate but permits the capacitor C5 to discharge through the resistors R4 and R4a at a substantially greater rate.

In standby operation, the time period during which valve V2 conducts is normally sufficient to cause the capacitor C5 to receive a full charge whereby a relatively long time interval will be required for the sequence timer 12 to time out. The same effect may be obtained when the off time interval timer 52 is sufficiently great. Under either of these two conditions, sufficient time will elapse to permit the control 84 to move the electrodes to their full or wide open position. When the electrodes are moved from their wide or fully open position into their work engaging position the maximum time is required for them to properly seat against the work. This is automatically provided by the longer time of the network 12 to time out. When, however, the off time provided by the timer 52 is reduced, the interval between the time that the control 84 is actuated to open the electrodes and reactuated to close the electrodes is shortened. This results in a shortened time that the control 84 acts to move the electrodes toward open position and the electrodes will not open up as much. Since the electrodes are not so far apart when the valve V1 reconducts to reenergize the ram control 84 to again bring the electrodes against the work, a shorter squeeze time interval is required for their movement into proper engagement with the work. Since the charging time of the capacitor C5 is proportional to the length of time that the ram control 84 is actuated to cause the electrodes to move away from the work, the charge accumulated thereby will be proportional to the spacing of the electrodes. Therefore, the time required for the network 12 to discharge to its predetermined minimum critical value at which valve V3 conducts is variable as a function of the distance that the electrodes must move to seat against the work. With the present construction, the squeeze time is always long enough to insure proper engagement of the electrodes with the work and yet is not so long that time is wasted by an unnecessarily long squeeze time.

If the maximum squeeze time interval for any setting of the variable resistor R4 is desired irrespective of the length of off time, the switch SW2 is closed to shunt out the rectifier RE1 and the resistor R5 connected in series therewith whereby the capacitor C5 will have a charging rate such that it will, like capacitor C4, assume its full charge in a single half cycle conduction of the valve V2.

While, generically, the invention contemplates the use of any type of electric valve for the valve V2, the thyratron type of valve is preferred because this type of valve will, whenever it conducts, always conduct long enough to completely charge the capacitor C4. Whenever the switches SW1 and SW2 are both closed, such a valve will always completely charge the capacitor C5 as well. Under certain conditions, a high vacuum type of valve V2 might not provide a full charge under all operating conditions.

What is claimed and is desired to be secured by United States Letters Patent is as follows:

1. An electrical timing network comprising a first and a second energy storage device each having a pair of terminals, means connecting a first terminal of each of said pair of terminals together, an asymmetric current flow device having a first effective impedance to current flow in one direction and a second effective impedance to current flow in the opposite direction, the magnitude of said second effective impedance being greater than the magnitude of said first effective impedance, means including said asymmetric device connecting the second terminal of said first storage device to the second terminal of said second storage device, said asymmetric device being polarized to provide said second impedance during charging of said one storage device, a discharge circuit connected between said first terminals and said other terminal of said other storage device, an output circuit connected to be energized by the voltage across said second storage device, an electric valve having a pair of main electrodes, means connecting one of said electrodes to one terminal of said second storage device, means connecting other said electrode to other terminal of said second storage device, a source of electrical potential, means connecting one end of said source to one of said electrodes of said valve, means connecting other end of said source to the other of said electrodes of said valve, said means including said second storage means, and timing means separate from said storage devices for controlling the conductive period of said valve.

2. The combination of claim 1 in which said timing means is actuated as a consequence of the discharging of both of said storage devices.

3. An electrical network comprising a first and a second capacitor each having a first and a second terminal, a dry disc type rectifier, a control valve having a pair of main electrodes and a control electrode, a controlled valve having a pair of electrodes the potential between which controls its conductive condition, a resistor unit having a first and a second terminal, means connecting said first terminals of said capacitors and said resistor unit together and to a first of a pair of timing network terminals, means including said rectifier connecting together said second terminals of said capacitors, said rectifier being polarized to provide its greater impedance during charging of said first capacitor, means connecting together said second terminal of said second capacitor and said second terminal of said resistor unit and the other of said timing network terminals, means including said control valve for connecting said timing network terminals across a source of electric potential, and means connecting said timing network terminals across said pair of electrodes of said controlled valve.

4. The combination of claim 3 in which there is provided a second timing means connected to control the conductive condition of said control valve, and means actuated as a consequence of a change in the conductive condition of said controlled valve for actuating said second timing means.

5. An electrical timing network comprising a first and a second energy storage device each having a pair of terminals, means connecting a first terminal of each of said pair of terminals together, an asymmetric current flow device having a first effective impedance to current flow in one direction and a second effective impedance to current flow in the opposite direction, the magnitude of said second effective impedance being substantially greater than the magnitude of said first effective impedance, means including said asymmetric device connecting the other terminal of said first storage device to the other terminal of said second storage device, charging means for charging both of said storage devices connected between said terminals of said second storage device, charging circuit means for said first storage device including said asymmetric device and said charging means, said asymmetric device being polarized to provide said second impedance during charging of said first storage device, resistive means, discharge circuit means including said resistive means for discharging said second storage device, discharge circuit means including said resistive means and said asymmetric device for discharging said first storage device, and output circuit means responsive to the condition of charge of both of said storage devices.

6. An electrical timing network comprising a first and a second capacitor each having a pair of terminals, means connecting a first terminal of each of said pair of terminals together, means including an asymmetric current flow device, said means having a first effective impedance to current flow in one direction and a second effective impedance to current flow in the opposite direction, the magnitude of said second effective impedance being substantially greater than the magnitude of said first effective impedance, means including said asymmetric device connecting the other terminal of said first of said capacitors to the other terminal of the said second of said capacitors, charging means for charging both of said capacitors connected between said terminals of said second capacitor, charging circuit means for said first capacitor including said asymmetric device and said charging means, said asymmetric device being polarized to provide said second impedance during charging of said first capacitor, resistive means, discharge circuit means including said resistive means for discharging said second capacitor, discharge circuit means including said resistive means and said asymmetric device for discharging said first capacitor, and output circuit means responsive to the condition of charge of both of said capacitors.

7. An electrical timing network comprising a first and a second storage device each having a pair of terminals, means connecting a first terminal of each of said pair of terminals together, a dry disc rectifying device having a first effective impedance to current flow in one direction and a second effective impedance to current flow in the opposite direction, means including said rectifying device connecting the other terminal of said first storage device to the other terminal of said second storage device, charging means for charging both of said storage devices connected between said terminals of said second storage device, charging circuit means for said first storage device including said rectifying device and said charging means, said rectifying device being polarized to provide its greater impedance during charging of said first storage device, variable resistance means, discharge circuit means including said resistance means for discharging said second storage means, discharge circuit means including said resistance means and said rectifying device for discharging said first storage device, and output circuit means responsive to the condition of charge of both of said storage devices.

8. An electrical timing network associable with a source of energy comprising a first energy storage means, an asymmetric current flow device, charging circuit means including said asymmetric current flow device for charging said first energy storage means from the source, a second energy storage means, charging circuit means independent of said asymmetric current flow device for charging said second energy storage means from the source, resistive means, discharge circuit means including said asymmetric current flow device and said resistive means for discharging said first energy storage means, discharge circuit means including said resistive means for discharging said second energy storage means, and control means for selectively effectuating the charge and discharge of both of said energy storage means.

9. An electrical timing network associable with a source of energy comprising a first capacitor, an asymmetric current flow device, charging circuit means including said asymmetric current flow device for charging said first capacitor from the source, a second capacitor, charging circuit means independent of said asymmetric current flow device for charging said second capacitor from the source, resistive means, discharge circuit means including said asymmetric current flow device and said resistive means for discharging said first capacitor, discharge circuit means including said resistive means for discharging said second capacitor, and control means including an electric valve for selectively effectuating the charge and discharge of both of said capacitors.

10. In a control circuit for a spot welding machine having an electrode which is repetitively moved away from a workpiece a variable distance and having actuating means for moving said electrode towards the workpiece and for holding the electrode in engagement with the workpiece, the combination of means for producing a signal indicative of the distance between the electrode and the workpiece, means controlled by said signal for producing a signal indication having a characteristic which varies in accordance with the variations of said signal, and means responsive to said signal indication for operating said actuating means for a period of time determined by said characteristic of said signal indication.

11. In a control circuit for a spot welding machine having means for repetitively moving an electrode away from a workpiece a variable distance and having actuating means for moving said electrode towards the workpiece and for holding the electrode in engagement with the workpiece, the combination of means for producing a signal having a characteristic which varies in accordance with the distance between the electrode and the workpiece, means responsive to said signal characteristic for producing a signal indication having an amplitude exceeding a predetermined magnitude for a period of time controlled by said signal, and means responsive to said signal indication for operating said actuating means for a period of time determined by said signal indication.

12. The combination of claim 11 further including means for causing the amplitude of the said signal indication to exceed said predetermined magnitude for a preselected minimum interval of time in response to any said signal.

13. In a control circuit for a welding machine having actuating means for moving an electrode towards a workpiece at a predetermined rate and for holding the electrode in engagement with the workpiece and having means for moving the electrode away from the workpiece at a preselected rate and for a distance determined by the duration of a preselected time interval, the combination of interval determining means for controlling said preselected time interval, means effective after the termination of said preselected time interval for producing an electrical signal having a characteristic determined by the duration of said preselected time interval, and means responsive to said signal for operating said actuating means for a period of time determined by said characteristic of said signal.

14. In a control circuit for a spot welding machine having actuating means for repetitively moving an electrode towards a workpiece at a predetermined rate and for holding the electrode in engagement with the workpiece and having means for moving the electrode away from the workpiece at a preselected rate and for a distance determined by the duration of a preselected time interval, the combination of interval determining means for controlling said preselected time interval, means controlled by said interval determining means and effective after the termination of said preselected time interval for producing an electrical signal having an amplitude exceeding a predetermined magnitude for a period of time related to the duration of said preselected time interval, and means responsive to said signal for operating said actuating means while the amplitude of said signal exceeds said predetermined magnitude.

15. The combination of claim 14 in which said means for producing said electrical signal is an electrical network comprising a first and a second capacitor each having a first and a second terminal, a dry disc type rectifier, a control valve having a pair of main electrodes and a control electrode, a controlled valve having a pair of electrodes the potential between which controls its conductive condition, a resistor unit having a first and a second terminal, means connecting said first terminals of said capacitors and said resistor unit together and to a first of a pair of timing network terminals, means including said rectifier connecting together said second terminals of said capacitors, said rectifier being polarized to provide its greater impedance during charging of said first capacitor, means connecting together said second terminal of said second capacitor and said second terminal of said resistor unit and the other of said timing network terminals, means including said control valve for connecting said timing network terminals across a source of electric potential, and means connecting said timing network terminals across said pair of electrodes of said controlled valve.

16. In a control circuit for a spot welding machine having actuating means for repetitively moving an electrode towards a workpiece at a predetermined rate and for holding the electrode in engagement with the workpiece and having means for moving the electrode away from the workpiece at a preselected rate and for a distance controlled by the duration of a preselected time interval, the combination of interval determining means for producing a signal having an amplitude exceeding a predetermined magnitude for a period of time equal to said preselected time interval, means responsive to said signal and effective after the termination of said preselected time interval for producing an electrical signal having an amplitude exceeding a predetermined magnitude for a period of time related to the duration of said preselected time interval, and means responsive to said electrical signal for operating said actuating means while the amplitude of said electrical signal exceeds said predetermined magnitude.

17. The combination of claim 16 in which said electrical signal has an amplitude which exceeds said predetermined magnitude for a first time period whenever the amplitude of said signal exceeds its said predetermined magnitude a finite period of time less than a first preselected time period, and in which the amplitude of said electrical signal continues to exceed its said predetermined magnitude for an additional length of time determined by the period of time during which the amplitude of said signal exceeds its said preselected magnitude beyond said first preselected time period.

18. The combination of claim 16 further including means for insuring that the amplitude of said electrical signal will exceed its said predetermined magnitude for a preselected minimum period of time following and in response to any said signal.

19. In a control circuit for a spot welding machine having actuating means for repetitively moving an electrode towards a workpiece at a predetermined rate and for holding the electrode in engagement with the workpiece and having means for moving the electrode away from the workpiece at a preselected rate and for a distance determined by the duration of a preselected time interval, the combination of interval determining means for producing a signal having a duration equal to said preselected time interval for controlling the means for moving the electrode away from the workpiece, and means including storage means responsive to said signal and effective after the termination of said preselected time interval for operating said actuating means for a period of time which varies with the duration of said preselected time interval.

20. The combination of claim 19 in which said means including storage means further includes means effective in response to said signal for operating said actuating means for a preselected minimum period of time which is independent of the duration of any said signal having a duration less than a predetermined duration.

References Cited in the file of this patent

UNITED STATES PATENTS

| | | |
|---|---|---|
| 2,073,247 | Miller | Mar. 9, 1937 |
| 2,354,086 | Mackay | July 18, 1944 |
| 2,479,335 | Fox | Aug. 16, 1949 |
| 2,515,196 | Coe | July 18, 1950 |
| 2,534,385 | Stanback et al. | Dec. 19, 1950 |
| 2,635,213 | Bruene | Apr. 14, 1953 |
| 2,658,141 | Kurland et al. | Nov. 3, 1953 |
| 2,725,472 | Hartwig | Nov. 29, 1955 |
| 2,867,721 | Churchill | Jan. 6, 1959 |